(12) United States Patent
Eaton et al.

(10) Patent No.: US 7,388,619 B2
(45) Date of Patent: Jun. 17, 2008

(54) MOBILE DEVICE WITH A COMBINATION CAMERA AND LOUDSPEAKER

(75) Inventors: Chris Eaton, Cary, NC (US); Matt Murray, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 772 days.

(21) Appl. No.: 10/733,593

(22) Filed: Dec. 11, 2003

(65) Prior Publication Data

US 2005/0128322 A1    Jun. 16, 2005

(51) Int. Cl.
| | |
|---|---|
| H04N 7/00 | (2006.01) |
| H04N 11/00 | (2006.01) |
| H04N 5/225 | (2006.01) |
| H04N 9/04 | (2006.01) |
| H04R 1/02 | (2006.01) |
| H04R 25/00 | (2006.01) |
| G09F 27/00 | (2006.01) |

(52) U.S. Cl. .............. 348/552; 348/207.99; 348/335; 381/87; 381/124; 381/152

(58) Field of Classification Search ........... 359/231, 359/230; 396/133; 348/552
See application file for complete search history.

(56) References Cited

U.S. PATENT DOCUMENTS

| | | | |
|---|---|---|---|
| 4,802,746 A * | 2/1989 | Baba et al. | 359/667 |
| 6,081,388 A * | 6/2000 | Widl | 359/666 |
| 6,639,629 B1 | 10/2003 | Takayama et al. | |
| 7,050,600 B2 * | 5/2006 | Saiki et al. | 381/388 |
| 2001/0002849 A1 | 6/2001 | Arai | |
| 2003/0043478 A1 * | 3/2003 | Choi et al. | 359/823 |

FOREIGN PATENT DOCUMENTS

| | | |
|---|---|---|
| CN | 1327669 | 12/2001 |
| CN | 2545783 | 4/2003 |
| CN | 1420673 | 5/2003 |
| EP | 1 357 726 | 10/2003 |
| GB | 2 376 592 | 12/2002 |
| GB | 2376592 A * | 12/2002 |
| JP | 11072723 A * | 3/1999 |
| WO | WO 0141496 A2 * | 6/2001 |

OTHER PUBLICATIONS

PCT International Search Report; International Application No. PCT/US2004/020004 dated Nov. 21, 2004.

(Continued)

Primary Examiner—David Ometz
Assistant Examiner—Wanda M. Negrón
(74) Attorney, Agent, or Firm—Coats & Bennett, P.L.L.C.

(57) ABSTRACT

A combination camera and loudspeaker is described herein. The combination camera and loudspeaker includes a lens for selectively manipulating an image and a loudspeaker assembly disposed proximate the lens for projecting audible sounds. In one embodiment, a transparent piezo-electric aligned with at least a portion of the lens projects audible sound based on electrical signals applied to the piezo-electric diaphragm. In another embodiment, a speaker coil and magnet within the loudspeaker assembly encircles an outer perimeter of the lens, while a transparent diaphragm connected to the speaker coil and aligned with at least a portion of the lens projects audible sound based on the interaction between the speaker coil and magnet. The camera captures an image when light is transmitted through the transparent diaphragm to the camera lens. Further, the combination camera and loudspeaker may include a controller for selectively controlling optical properties of the transparent diaphragm.

29 Claims, 5 Drawing Sheets

OTHER PUBLICATIONS

MMC2001 Conference: MMC2001-601: A Transparent and Flexible Smart Polymer, Jun. 27-29, 2001. http://www-ceam.ucsd.edu/mmc2001/program/MMC2001-601.html.

First Office Action, Chinese Patent Application No. 200480041436.X, Mailing Date: Dec. 13, 2007.

* cited by examiner

MOBILE DEVICE WITH A COMBINATION CAMERA AND LOUDSPEAKER

BACKGROUND OF THE INVENTION

The present invention relates to a mobile device, such as a cellular telephone, that combines one or more internal components to reduce mobile device size, and more particularly to a mobile device that combines the function of a camera and a loudspeaker into a single location.

Over the past decade, the popularity of mobile devices, such as cellular telephones, Portable Digital Assistants (PDA), MP3 players, etc., has dramatically increased. One reason for this dramatic increase is that manufacturers continue to add new features to mobile devices, making them more functional and attractive to a wider variety of consumers. Another reason is the small size and portability of the mobile devices. Because smaller mobile devices with multiple features are in higher demand than their larger and/or simpler counterparts, manufacturers spend considerable resources each year exploring new ways to further reduce the size of multiple feature mobile devices. However, the goal of adding new features often conflicts with the goal of reducing the size.

SUMMARY OF THE INVENTION

The present invention describes a combination camera and loudspeaker that includes a lens, for selectively capturing and manipulating an image, and a loudspeaker disposed proximate the lens for projecting audible sounds. The loudspeaker includes a transparent diaphragm aligned with at least a portion of the lens. In some embodiments, the loudspeaker also includes a speaker coil connected to the transparent diaphragm and disposed around at least a portion of the perimeter of the lens. The loudspeaker may further include a controller for selectively controlling optical properties of the transparent diaphragm.

According to an exemplary embodiment of the present invention, an image is captured by a camera when light is transmitted through a transparent diaphragm of a speaker to an adjacent lens of the camera. Further, a speaker controller may selectively control optical properties of the camera to further manipulate the image.

DETAILED DESCRIPTION OF THE INVENTION

The following describes a combination camera and loudspeaker assembly. In exemplary embodiments, the combination camera and loudspeaker assembly of the present invention is disposed within a mobile device. Mobile devices utilized with the present invention may comprise any known mobile communication device or portable electronic device that includes a camera. Such mobile devices include, but are not limited to, cellular telephones, personal data assistants (PDA), personal communication service (PCS) devices, palm-top computers, and the like.

Figure 1:
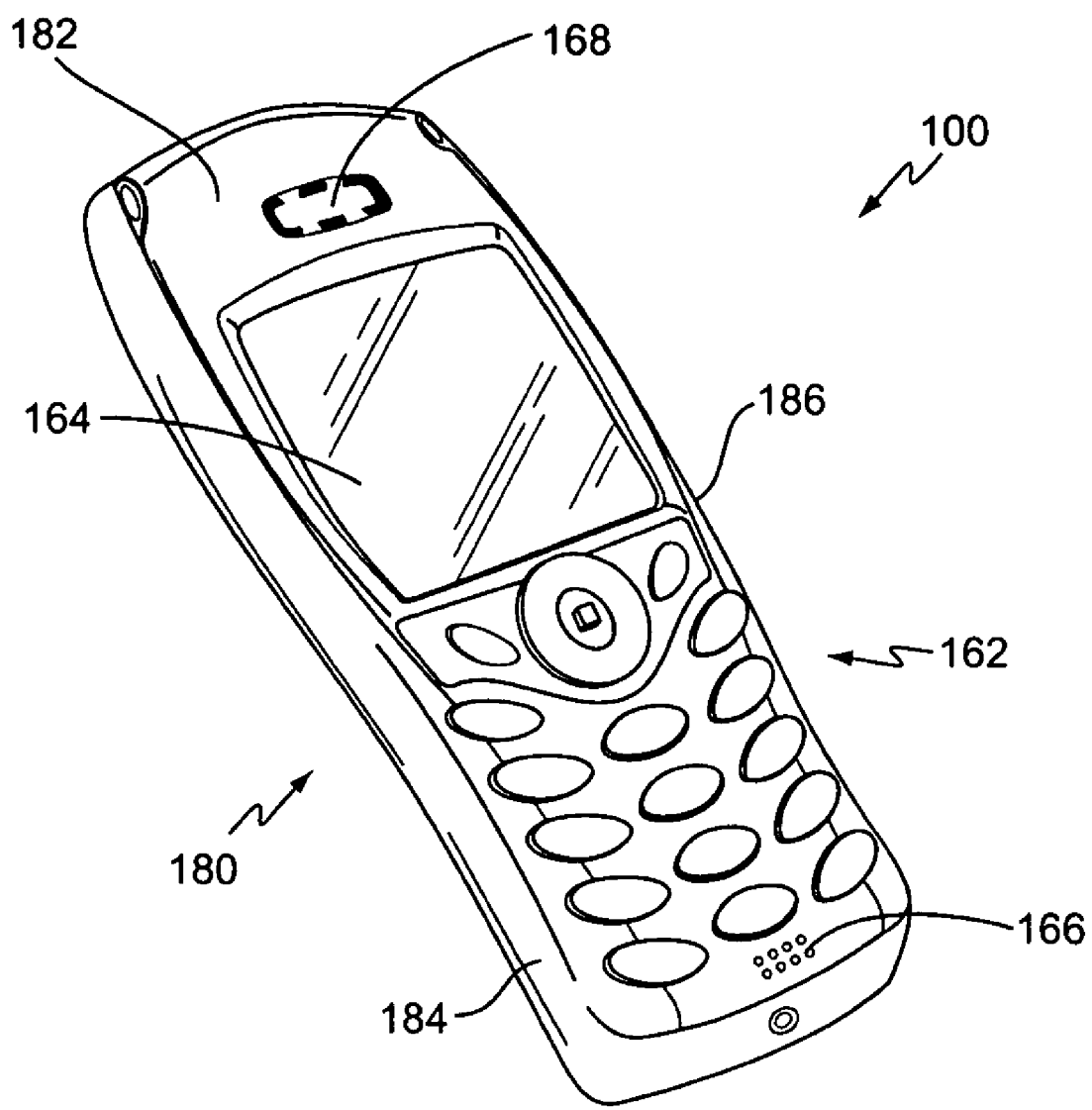
FIG. 1 is a perspective view of an exemplary camera phone as seen from the front.
Figure 2:
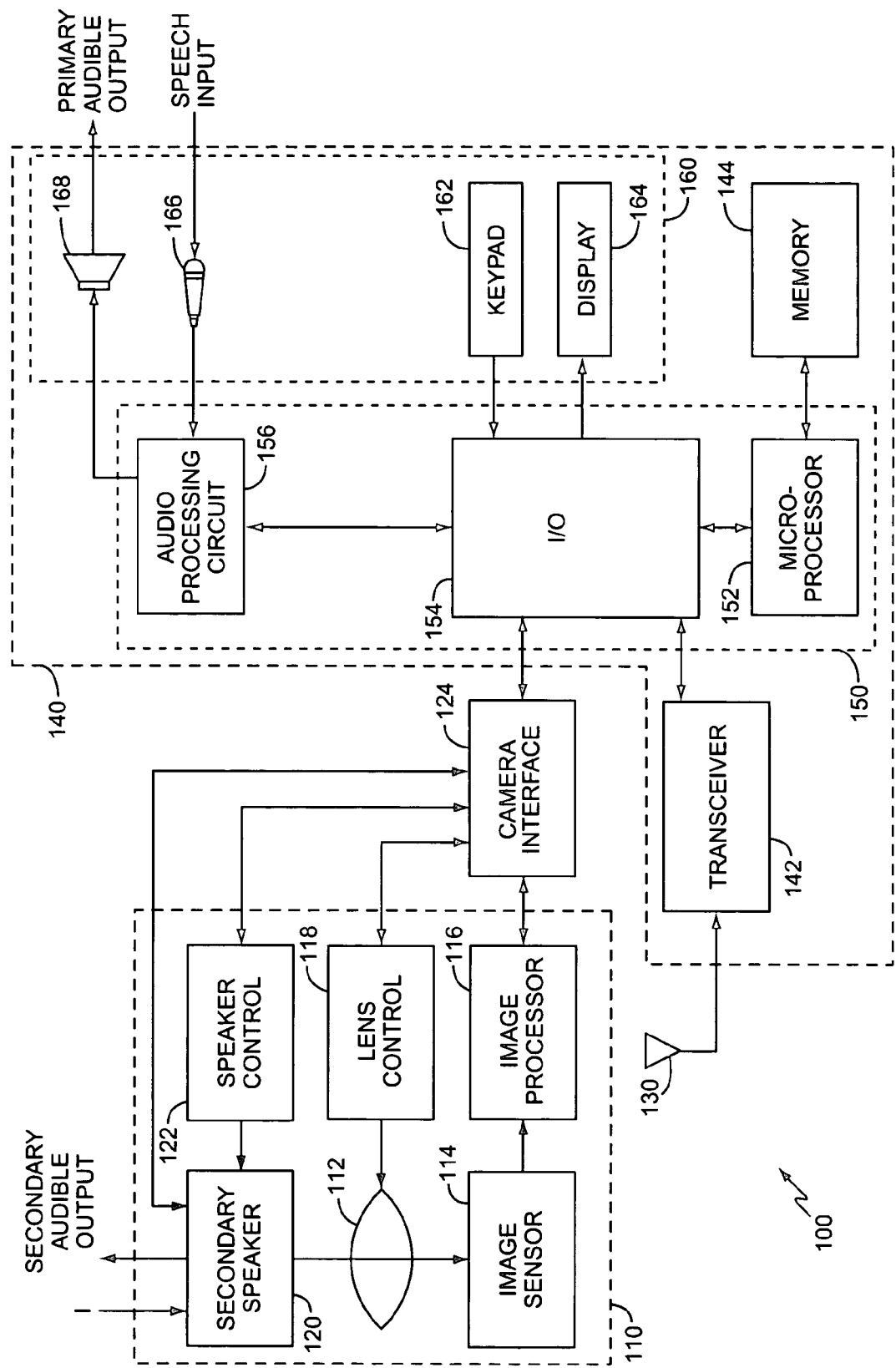
FIG. 2 is a block diagram of a mobile device according to the present invention.

FIGS. 1 and 2 illustrate an exemplary mobile device according to the present invention. The illustrated mobile device combines a cellular telephone and a camera into the same physical package, and is referred to herein as camera phone 100. The present invention is not, however, limited to a camera phone and may be embodied in other mobile devices that incorporate a camera, as discussed above.

Camera phone 100 includes a housing 180 having a front 182, a back 186 (FIG. 3), and an outer edge 184 that connects front 182 to the back 186. As shown in FIG. 1, keypad 162, display 164, an output port for a primary speaker 168, and an input port for a microphone 166 are disposed on the front 182 of housing 180, and operate as described further below.

A block diagram of the camera phone 100, shown in FIG. 2, illustrates functional elements of an exemplary camera phone 100. Camera phone 100 comprises a camera 110, a camera interface 124, and a communication circuit 140. Communication circuit 140 comprises transceiver 142, memory 144, microprocessor 152, input/output circuit 154, audio processing circuit 156, and user interface 160. Transceiver 142 is a fully functional cellular radio transceiver coupled to an antenna 130 for receiving and transmitting signals. Those skilled in the art will appreciate that transceiver 142 may operate according to any known standard, including Global System for Mobile Communications (GSM), Universal Mobile Telecommunication System (UMTS), TIA/EIA-136, Code Division Multiple Access (CDMA), cdmaOne, cdma2000, and Wideband CDMA.

Memory 144 represents the entire hierarchy of memory in a mobile device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 152. Microprocessor 152, input/output circuit 154, audio processing circuit 156, and/or memory 144 may be incorporated into a specially designed application-specific integrated circuit (ASIC) 150.

Microprocessor 152 controls the operation of camera phone 100 according to programs stored in memory 144. The control functions may be implemented in a microprocessor 152, which may comprise a single microprocessor or multiple microprocessors. Suitable microprocessors may include, for example, both general purpose and special purpose microprocessors and digital signal processors.

Input/output circuit 154 interfaces microprocessor 152, transceiver 142, audio processing circuit 156, and user interface 160 of communication circuit 140. Further, input/output circuit 154 interfaces microprocessor 152 with camera 110 via camera interface 124. Camera interface 124 may also interface camera 110 with user interface 160 according to any method known in the art. While camera interface 124 is shown as a separate component in FIG. 1, it will be understood that camera interface 124 may be incorporated with input/output circuit 154.

User interface 160 includes a keypad 162, display 164, microphone 166, and primary speaker 168. Keypad 162, disposed on a side of camera phone 100 as seen in FIG. 1, includes an alphanumeric keypad and, optionally, a navigation control, such as a joystick control as is well known in the art. Keypad 162 allows the operator to dial numbers, enter commands, and select options. Display 164 allows operators to see dialed digits, images, called status, menu options, and other service information. Microphone 166 converts speech into electrical audio signals and primary speaker 168 converts audio signals into audible sounds that are projected from camera phone 100. Audio processing circuit 156 provides analog audio output signals to primary speaker 168 and accepts analog audio inputs from microphone 166.

Referring now to camera 110 in FIG. 2, camera 110 interfaces with communication circuit 140 via camera interface 124, and includes lens 112, image sensor 114, image processor 116, and lens control 118. Lens 112, comprising one or more lenses, manipulates an image by collecting and focusing the image onto image sensor 114 based on control signals from lens control 118. Lens control 118 controls the optical properties, such as focus, zoom, shutter speed, etc., of lens 112 according to means known in the art. Image sensor 114 captures the images formed by lens 112, and may comprise any conventional image sensor, such as a charge-coupled device (CCD), a complementary metal oxide semiconductor (CMOS) image sensor, and the like.

Image processor 116 processes raw image data captured by image sensor 114 for subsequent storage in memory 144, output to display 164, and/or for transmission to a far-end user by communication circuit 140. The image processor 116 may, for example, be a conventional digital signal processor programmed to process image data, as known in the art.

According to exemplary embodiments, camera 110 may also include secondary speaker 120. Secondary speaker 120 projects audible signals, such as high-level voice audio, and/or notification signals, i.e., a ring or an alarm, from camera phone 100. Such audible signals are provided by audio processing circuit 156 via camera interface 124. As discussed further below, secondary speaker is incorporated into camera 110 to save space within the camera phone 100. While FIG. 2 illustrates primary speaker 168 and secondary speaker 120 as two separate speakers, those skilled in the art will understand that primary and secondary speakers 168, 120 may be combined into a single speaker.

Camera 110 may also include speaker control 122 for controlling optical properties of the secondary speaker 120 to supplement the lens 112, as discussed further below, without requiring any additional space. While FIG. 2 shows lens control 118 and speaker control 122 as separate control units, those skilled in the art will appreciate that these controllers may be combined into a single control unit and/or may be incorporated with camera interface 124.

Figure 3:
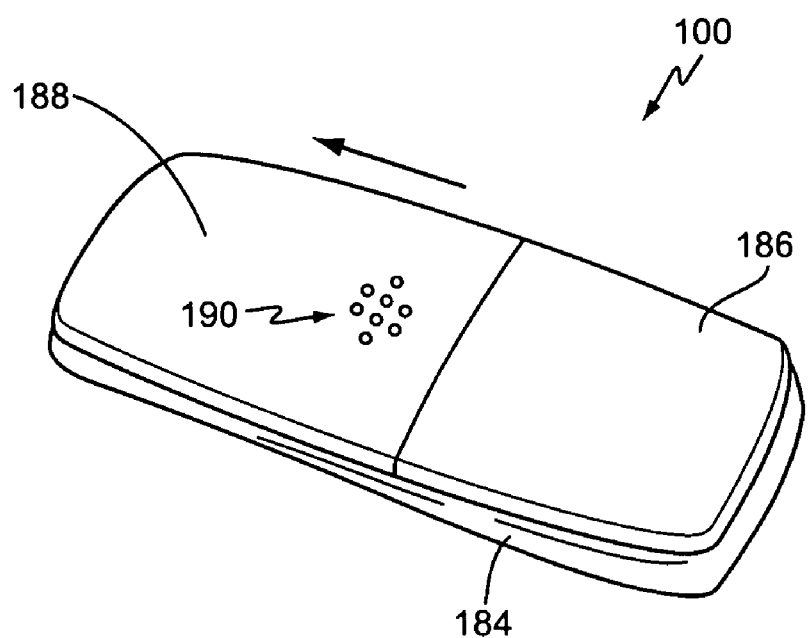
FIG. 3 is a perspective view of an exemplary camera phone with a slidable rear panel as seen from the rear.
Figure 4:
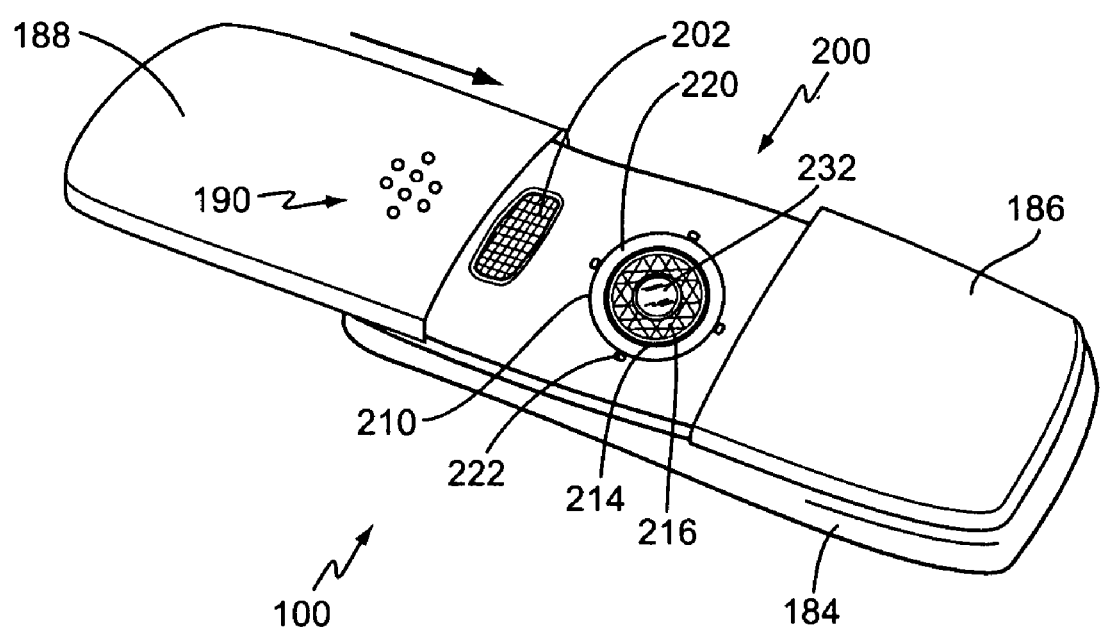
FIG. 4 is a perspective view of the exemplary camera phone of FIG. 3 with the slidable rear panel open.

Referring now to FIGS. 3 and 4, the back 186 of an exemplary camera phone 110 will be described. The back 186 of camera phone 100 may include a slidable panel 188 to protect and/or activate the camera-loudspeaker assembly 200 (FIGS. 4 and 5) of camera phone 100. When camera phone 100 operates as a communication device, panel 188 is most often positioned in the closed position (FIG. 3) to protect elements of the camera-loudspeaker assembly 200. As shown in FIG. 3, panel 188 may include a plurality of openings 190 to enable sound from loudspeaker assembly 210 to be projected from camera phone 100 when panel 188 is closed. Those skilled in the art will appreciate that panel 188 only represents one way to protect camera-loudspeaker assembly 200. Other methods known in the art may be used, and may include flip panels, permanent transparent coverings, etc.

As shown in FIG. 4, opening panel 188 exposes camera-loudspeaker assembly 200 and an optional flash 202. Camera-loudspeaker assembly 200 generally represents a combination of a camera and a loudspeaker, and comprises loudspeaker assembly 210, camera 230 (see FIG. 5), and optionally, protective plate 220. When panel 188 is opened, camera-loudspeaker assembly 200 may be used to manipulate images and/or display the images on display 164 according to any method known in the art. Further, camera-loudspeaker assembly 200, in coordination with flash 202, may be used to capture images and store them in memory 144 according to any method known in the art.

Figure 5:
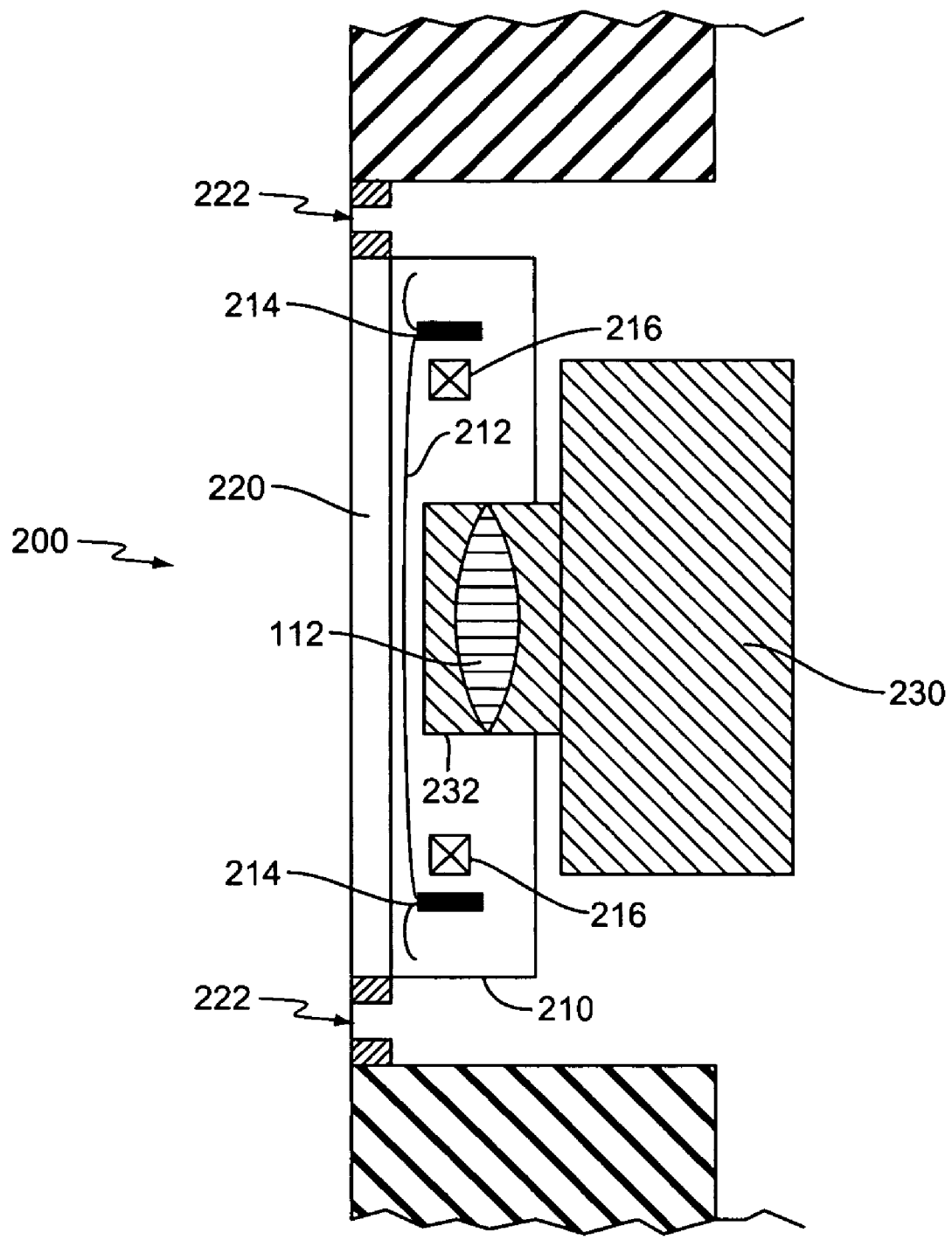
FIG. 5 illustrates details of an exemplary cross-section of a camera-loudspeaker assembly according to the present invention.

Referring now to FIG. 5, we will discuss further details of camera-loudspeaker assembly 200. FIG. 5 illustrates a cross-section of the exemplary camera-loudspeaker assembly 200 of FIG. 4. As discussed above, camera-loudspeaker assembly 200 comprises loudspeaker assembly 210, camera 230, and optionally, protective plate 220. Camera 230 includes lens 112 encased in lens housing 232, lens control 118 (not shown), image sensor 114 (not shown), and image processor 116 (not shown), as discussed above.

Figure 6:
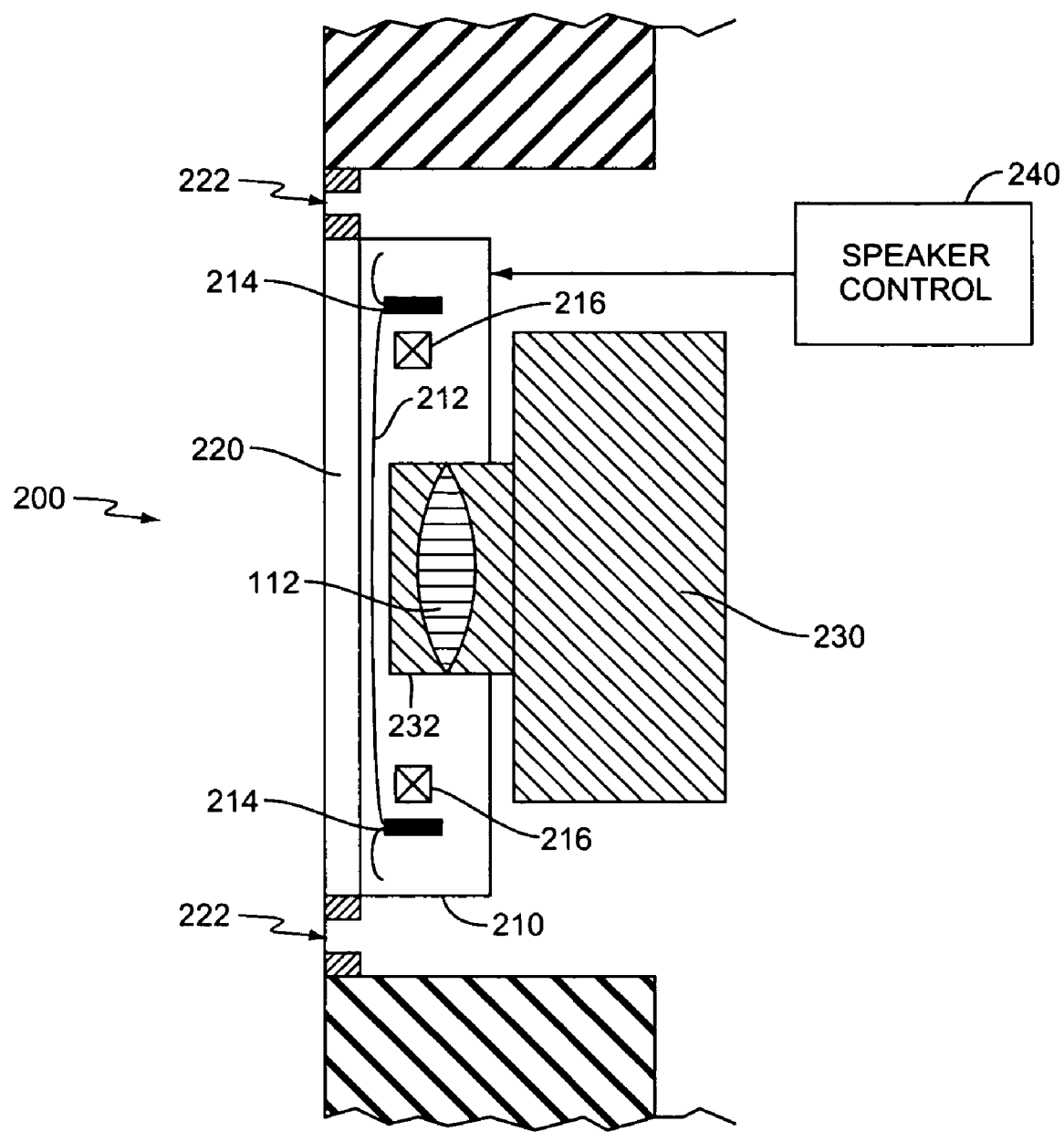
FIG. 6 illustrates details of another exemplary cross-section of a camera-loudspeaker assembly according to the present invention.

Loudspeaker assembly 210, generally corresponding to secondary speaker 120, includes a speaker coil 214 proximate a speaker magnet 216. As shown in FIG. 4, speaker coil 214 assumes a generally circular configuration. The speaker magnet 216 also assumes a generally circular configuration, and is disposed proximate the speaker coil 214. Further, the circular configurations of the speaker coil 214 and the magnet 216 define an inner opening within the confines of the speaker coil 214 and magnet 216. While FIGS. 4-6 show a speaker magnet 216 interiorly disposed from speaker coil 214, those skilled in the art will appreciate that speaker magnet 216 may alternatively be disposed around an outer perimeter of speaker coil 214.

A transparent diaphragm 212 connected to speaker coil 214 spans at least a portion of the opening defined by speaker coil 214 and magnet 216. As used herein, "transparent" is defined as capable of transmitting light within a desired wavelength range without appreciable scattering so that images lying beyond may be seen clearly. Diaphragm 212 comprises a thin, flexible, and/or transparent material, such as polyethylene naphthalate (PEN) or polyethylene terephthalate PET), between 10 μm and 50 μm thick. In exemplary embodiments, diaphragm 212 is approximately 20 μm thick.

As understood by those skilled in the art, fluctuating interactions between the speaker coil 214 and the magnet 216 cause diaphragm 212 to vibrate and project audible sound. The rate and distance that the diaphragm 212 moves defines the frequency and amplitude, respectively, of the projected sound waves. In the present invention, sound waves are projected from the transparent diaphragm 212 via openings 222 in housing 180. Further, as discussed above, protective panel 188 may also include additional openings 190 to enable the sound waves generated by loudspeaker assembly 210 to project from the camera phone even when panel 188 assumes a closed position, as shown in FIG. 3.

In alternate embodiments, loudspeaker assembly 210 may comprise a diaphragm 212 made of a transparent piezo-electric material. The piezo-electric diaphragm may be made of, for example, a mixture of a commercial polyethylene diepoxypropyl ether (PEGDE) and a salt, such as magnesium sulfate. In these types of loudspeaker assemblies 210, a voltage applied directly to the piezo-electric material causes the diaphragm to vibrate and project audible sound.

As such, loudspeaker assemblies 210 with transparent piezo-electric diaphragms typically do not require a speaker coil 214 or speaker magnet 216.

The loudspeaker assembly 210 of the present invention typically comprises an open configuration behind the transparent diaphragm 212 to enable the lens housing 232 of camera-loudspeaker assembly 200 to generally align with a portion of lens 112. In embodiments with a speaker coil 214 and magnet 216, lens housing 232 may fit within an opening defined by the speaker coil 214 and magnet 216. As a result, speaker coil 214 and magnet 216 are disposed around a perimeter of lens housing 232, and diaphragm 212 spans at least a portion of the lens housing 232, such that diaphragm 212 is generally aligned with lens 112. In any event, the resulting camera-loudspeaker assembly 200 provides a camera 230 and loudspeaker 210 confined to the same space, and therefore reduces the overall space requirements of the camera phone 100.

As discussed above, diaphragm 212 is constructed of a thin, transparent, and flexible material. Such materials may possess optical properties. FIG. 6 illustrates an alternative embodiment of the present invention that exploits these optical properties to further enhance the functionality of camera 230. The alternate embodiment shown in FIG. 6 comprises a speaker control 240 in addition to the elements of camera-loudspeaker assembly 200 discussed above. Speaker control 240 selectively controls one or more optical properties of loudspeaker 210. As a result, loudspeaker 210, and more particularly, diaphragm 212, may further enhance the functionality of camera 230 by further manipulating the image being captured by the camera 230.

In an exemplary embodiment, speaker controller 240 may apply an electrical current to loudspeaker 210 to control one or more optical properties of diaphragm 212. These optical properties may include, but are not limited to, the radius of curvature of the diaphragm 212 and/or the relative distance between the diaphragm 212 and lens 112. As known by those skilled in the art, for example, a diaphragm 212, such as the piezo-electric diaphragm described above, may comprise a predefined radius curvature. As a result, diaphragm 212 operates as an additional lens working in conjunction with lens 112 to manipulate an image. Applying a control signal from speaker control 240 to loudspeaker 210 may stretch or relax diaphragm 212 and therefore, alter the radius of curvature. As understood by those skilled in the art, altering the radius of curvature will change the optical properties of the diaphragm 212, and therefore, will change the overall optical properties of the combination of diaphragm 212 and lens 112. As also understood by those skilled in the art, the amount of change made to the overall optical properties generally depends on the index of refraction of diaphragm 212.

In another example, loudspeaker 210 may include a motor (not shown) and a track, rail, or other means (not shown) for moving loudspeaker assembly 210 relative to lens 112. Applying a control signal to loudspeaker assembly 210 may activate the motor and cause diaphragm 212 to move closer to (or farther away from) lens 112 along the track or rail. As understood by those skilled in the art, this relative movement further alters the overall optical properties of the combination of diaphragm 212 and lens 112.

The above examples illustrate two methods of controlling optical properties of the camera 200. However, these examples are provided only for illustrative purposes; those skilled in the art will appreciate that the present invention is not limited to these two examples.

Because diaphragm 212 is thin and fragile, and because camera lenses are easily damaged, camera phone 100 may also include a permanent protective covering 220 disposed over at least a portion of loudspeaker 210 and lens housing 232. Covering 220 comprises a clear material, such as a transparent plastic, that protects the diaphragm 212 and the lens 112 of camera 230 from damage caused by external sources, such as dust, fingers, and the like. Further, covering 220 typically comprises a rigid material. While many embodiments of camera phone 100 may include protective covering 220, it will be understood that such a covering 220 is not essential to the present invention. Further, it will also be understood that the protective covering 220 may impact the optical properties of the camera 230, depending on the radius of curvature and index of refraction of the protective covering 220.

In summary, the present invention provides a combination camera and loudspeaker that both operate within the confines of a predetermined volume within a mobile device, such as a cellular telephone. Because loudspeaker 210 and camera 230 both utilize the same volume, valuable space within the mobile device is conserved. Further, some embodiments of the present invention may include a loudspeaker 210 with an optically active diaphragm 212 that works with the lens 112 to further enhance the functionality of the lens 112.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A combination camera and loudspeaker comprising:
   a lens for selectively capturing and manipulating an image; and
   a loudspeaker assembly disposed proximate the lens for projecting audible sounds, said loudspeaker assembly comprising:
   a speaker coil disposed around at least a portion of an outer perimeter of the lens; and
   a transparent diaphragm connected to the speaker coil and aligned with at least a portion of the lens.

2. The combination camera and loudspeaker of claim 1 further comprising a controller connected to the loudspeaker assembly for selectively controlling optical properties of the transparent diaphragm to selectively set a focal length of the camera.

3. The combination camera and loudspeaker of claim 2 wherein the controller selectively sets the focal length of the camera by selectively varying a distance between the transparent diaphragm and the lens.

4. The combination camera and loudspeaker of claim 2 wherein the controller selectively sets the focal length of the camera by modifying a radius of curvature of the transparent diaphragm.

5. The combination camera and loudspeaker of claim 1 wherein the transparent diaphragm comprises polyethylene naphthalate (PEN) or polyethylene terephthalate (PET) plastic.

6. The combination camera and loudspeaker of claim 1 wherein the transparent diaphragm is constructed of a transparent material with a thickness comprising between 10 μm and 50 μm.

7. The combination camera and loudspeaker of claim 6 wherein the transparent diaphragm is constructed of a transparent material with a thickness comprising approximately 20 µm.

8. The combination camera and loudspeaker of claim 1 wherein the combination camera and loudspeaker is disposed within a mobile device.

9. The combination camera and loudspeaker of claim 8 wherein the mobile device comprises a cellular telephone.

10. A method of manipulating an image with a camera assembly comprising a camera with a lens and a loudspeaker with a transparent diaphragm, the method comprising:
    aligning the transparent diaphragm with at least a portion of the lens; and
    selectively controlling optical properties of the transparent diaphragm to selectively set a focal length of the camera.

11. The method of claim 10 wherein selectively controlling the optical properties of the transparent diaphragm comprises selectively varying a distance between the transparent diaphragm and the lens to selectively set the focal length of the camera.

12. The method of claim 10 wherein selectively controlling the optical properties of the transparent diaphragm comprises selectively modifying a radius of curvature of the transparent diaphragm to selectively set the focal length of the camera.

13. The method of claim 10 wherein aligning the transparent diaphragm with at least a portion of the lens comprises aligning a polyethylene naphthalate (PEN) plastic, polyethylene terephthalate (PET) plastic, or a piezo-electric material with at least a portion of the lens.

14. The method of claim 10 wherein selectively controlling optical properties of the transparent diaphragm comprises applying a predetermined control signal to the transparent diaphragm to selectively set the focal length of the camera.

15. A camera assembly comprising:
    a lens for selectively manipulating an image;
    a loudspeaker comprising a transparent diaphragm aligned with at least a portion of the lens; and
    a controller for selectively controlling optical properties of the transparent diaphragm to enable the transparent diaphragm to further manipulate the image.

16. The camera assembly of claim 15 wherein the loudspeaker further comprises a speaker coil disposed around at least a portion of a perimeter of the lens and connected to the transparent diaphragm for generating audible signals to be projected by the transparent diaphragm.

17. The camera assembly of claim 15 wherein the controller selectively varies a distance between the transparent diaphragm and the lens to enable the transparent diaphragm to further manipulate the image.

18. The camera assembly of claim 15 wherein the controller selectively controls the optical properties of the transparent diaphragm by selectively modifying a radius of curvature of the transparent diaphragm to selectively set a focal length of the camera assembly.

19. The camera assembly of claim 15 wherein the transparent diaphragm is constructed of polyethylene naphthalate (PEN) plastic, polyethylene terephthalate (PET) plastic, or a piezo-electric material.

20. The camera assembly of claim 15 wherein the transparent diaphragm is constructed of a transparent material with a thickness comprising between 10 µm and 50 µm.

21. The camera assembly of claim 20 wherein the transparent diaphragm is constructed of a transparent material with a thickness comprising approximately 20 µm.

22. The camera assembly of claim 15 further comprising a protective panel disposed across at least a portion of the lens and the loudspeaker.

23. The camera assembly of claim 22 wherein the protective panel is constructed of a transparent material permanently disposed across at least a portion of the lens and the loudspeaker.

24. The camera assembly of claim 22 wherein the protective panel comprises a movable panel that covers at least a portion of the camera assembly in a first position and exposes at least a portion of the camera assembly in a second position.

25. The camera assembly of claim 24 wherein the protective panel comprises a rigid panel slidably connected to the camera assembly and movable between the first and second positions.

26. The camera assembly of claim 15 wherein the camera assembly is disposed within a mobile device.

27. The camera assembly of claim 26 wherein the mobile device comprises a cellular telephone.

28. A method of capturing an image with a camera comprising:
    transmitting light through a transparent diaphragm of a speaker to an adjacent lens of the camera; and
    selectively controlling the optical properties of the camera with a speaker controller to selectively set a focal length of the camera,
    wherein selectively controlling the optical properties of the camera comprises applying a control signal from the speaker controller to the speaker to selectively vary a distance between the transparent diaphragm and the lens or to selectively modify a radius of curvature of the transparent diaphragm.

29. The method of claim 28 wherein transmitting light through the transparent diaphragm of the speaker to the adjacent lens of the camera comprises transmitting light through polyethylene naphthalate (PEN) plastic, polyethylene terephthalate (PET) plastic, or a piezo-electric material.

* * * * *